United States Patent [19]

Schwerdt

[11] Patent Number: 5,031,885
[45] Date of Patent: Jul. 16, 1991

[54] RUBBER SLEEVE SPRING

[75] Inventor: Hans-Werner Schwerdt, Laudenbach, Fed. Rep. of Germany

[73] Assignee: Firma Carl Freudenberg, Weinheim/Bergstr., Fed. Rep. of Germany

[21] Appl. No.: 433,327

[22] Filed: Nov. 8, 1989

[30] Foreign Application Priority Data

Nov. 29, 1988 [DE] Fed. Rep. of Germany ....... 3840176

[51] Int. Cl.⁵ ............................................. F16F 15/12
[52] U.S. Cl. .................................. 267/141.2; 248/609; 267/281
[58] Field of Search ...................... 267/141, 141.2, 154, 267/281; 248/560, 603, 604, 609

[56] References Cited

U.S. PATENT DOCUMENTS

| 3,020,036 | 2/1962 | Kleinschmidt | 267/154 |
|---|---|---|---|
| 3,642,268 | 2/1972 | Hipsher | 267/281 |
| 4,471,935 | 4/1984 | Chiba et al. | 267/141.2 X |
| 4,889,328 | 12/1989 | Uno et al. | 267/141.2 X |

FOREIGN PATENT DOCUMENTS 2004621 4/1979 United Kingdom ............. 267/141.2

Primary Examiner—Duane A. Reger
Attorney, Agent, or Firm—Felfe & Lynch

[57] ABSTRACT

A rubber sleeve spring includes an internal part 1 an external part 2 which encloses the latter radially spaced-apart and a spring body 3 made of an elastomeric material which is disposed in the gap formed by this space and adhesively connected to the internal part 1 and the external part 2 and the spring body encloses at least three connecting arms 4, 5, 6 between the internal part 1 and the external part 2. At least one of the connecting arms 4, 5, 6 is completely separated by a separation 7 in at least one partial area of its longitudinal extension between the internal part 1 and the external part 2 and the separation 7 basically extends parallel to the longitudinal direction of the internal and external parts 1, 2 and at least one insert 8 is provided which is inserted in the separation 7 while generating an elastic preload in the components of the respective connecting arm 4, 5, 6 adjacent to both sides of the separation.

11 Claims, 5 Drawing Sheets

RUBBER SLEEVE SPRING

BACKGROUND OF THE INVENTION

The invention relates to a rubber sleeve spring of the type having an internal part, an external part radially spaced therefrom, and a rubber spring body of elastomeric material adhesively connected with the internal part and the external part. The spring body has at least three connecting arms between the inernal part and the external part and extending parallel thereto.

A rubber sleeve spring of this kind is disclosed in EP-A 0 009 120. The internal part and the external part thereof are formed by two rigid pipes which enclose one another. The pipes are joined by means of a spring body made of rubber elastic material which is disposed in the interspace by means of vulcanization. The spring body is attached to the pipes on both sides by means of thermal vulcanization of the material of which it is made. Unfortunately, the cooling following the thermal vulcanization causes a shrinkage of this piece of material for the spring body which significantly shortens the service life.

SUMMARY OF THE INVENTION

It is hence an object of the invention to further develop a rubber sleeve spring of this kind so that the service life is significantly improved and subsequent adjustment of the elastic resilience to certain requirements of usage is possible.

In the rubber sleeve spring in accordance with the invention at least one of the connecting arms is divided by a separation along at least part of its length between the internal part and the external part. The separation basically extends parallel to the longitudinal direction of the internal and external part, and at least one insert is provided which is inserted in the separation while generating an elastic preload in the components of the respective connecting arm which are adjacent to both sides of the separation. A preload so generated is not only present in the one connecting arm but it also uniformly spreads onto the other connecting arms. Between the internal and external part all connecting arms are thus at least free of internal tensile forces. An unintentional detaching of the internal part from the external part must not be feared anymore.

Furthermore, the possibility is given to quantitatively determine in the connecting arms the compressive preload which is required for usage by a mutual adjustment of the dimension between the width of the insert and the width of the separation given in the course of manufacture. This determination can be carried out subsequent to the thermal vulcanization and even during the intended use of the otherwise completed rubber sleeve spring. Also, the possibility is given to use standardized rubber sleeve springs of a certain configuration in connection with inserts of a different configuration with respect to the resilient bearing of loads of a different weight, for example, combustion engines of different performance classes and/or features.

In order to ensure that the ready-to-use rubber sleeve spring has no tensile preload at absolutely no place of the spring body made of rubber-elastic material, it proved to be advantageous when the partial area in which the separation is provided, encloses the entire length of the connecting arm. In addition, it proved to be advantageous when the insert exhibits a shape matching the separation. The compressive preloads which are generated in the areas contiguous to both sides of the separation by inserting the inserts are thus of an identical magnitude in all partial areas.

In order to permit a direction-neutral relative mobility of the internal part in the external part it proved to be advantageous when the separation is provided in two basically opposite connecting arms and when the connecting arms and the separation are configured symmetrically with respect to the external and internal parts. The mutual assignment between the internal part and the external part which follows the thermal vulcanization is retained in such a configuration even after the additional body is inserted.

In cases when static preloads are present which are asymmetric, it proved to be advantageous when the inserts which are to be inserted in the two separations have a thickness distinct from one another. After the inserts are inserted a directed preload can be thus generated which is proportioned such that the internal part is symmetrically associated with the external part after the static preload is applied. In the case of an internal part and external part which are tubes, they would be concentric. Correspondingly, the relative mobility of the two parts with respect to one another is balanced in every direction.

For reduced tooling costs, the insert can be inserted in a particularly simple way when the separation is directly adjacent either to the internal part or the external part. This variant is generally preferred.

In order ensure a stable fitting of the insert in the separation, it proved to be advantageous when the insert is provided with at least one projection extending over the separation and when the projection has a larger width in a direction which extends transversely to the separation and contacts the connecting arm. Advantageously, there are correspondingly configured projections provided on two opposing sides of the separation at the insert. An adhesive attaching of the insert in the separation is of course also possible.

The insert can be made of an elastomeric material which exhibits a greater hardness than the elastomeric material of the spring body. Generally, embodiments will be used which are completely rigidly configured and are preferably made of metal.

DETAILED DESCRIPTION OF THE PREFERRED EMBODIMENTS

Figure 1:
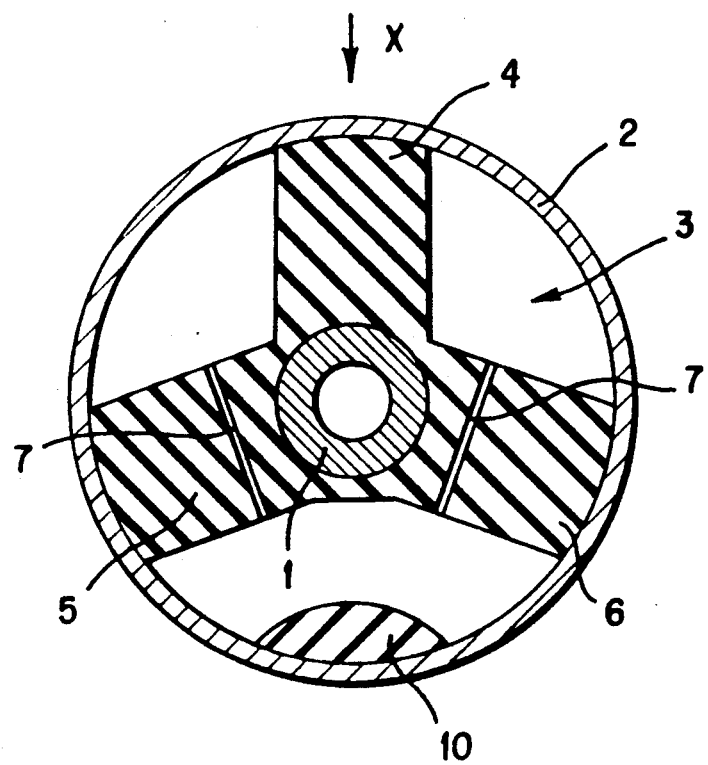
FIG. 1 is a cross-section of a first embodiment of sleeve spring prior to placement of the preload inserts.

The rubber sleeve springs as represented in FIGS. 1 to 4 include an internal part 1, respectively, an external part 2 enclosing the latter radially spaced therefrom, and a spring body 3 made of an elastomeric material which is adhesively attached to the internal part 1 and the external part 2 and disposed in the annular space therebetween. The spring body includes at least three connecting arms 4, 5, 6 between the internal part 1 and the external part 2. In the embodiment according to FIG. 1, the two basically opposing connecting arms 5, 6 are completely divided by respective separations 7 disposed between the internal part 1 and the external part 2 and extending in the longitudinal direction of the rubber sleeve spring. The connecting arms 5, 6 and the separations 7 are mirror-inverted and associated with one another as well as with the connecting arm 4. The internal part 1 and the external part 2 are of a pipe-like shape and made of metal. Once the thermal vulcanization of the spring body 3 is completed they have a common axis. In the lower part of the representation the external part 2 is provided with a stop buffer 10. The latter extends through the rubber sleeve spring covering its entire length.

Figure 1A:
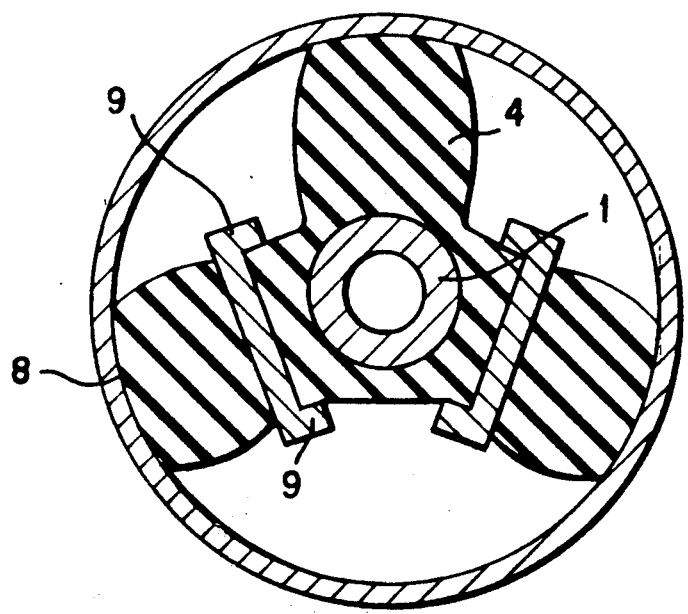
FIG. 1a is a cross-section corresponding to FIG. 1 after placement of the inserts.

FIG. 1a illustrates a rubber sleeve spring according to FIG. 1 after inserts 8 have been inserted. They are configured and disposed so as to be mirror-inverted. Their thickness is greater than the width of the separations 7 of the connecting arms 5, 6 as a matter of design. This results in a radial compression of the partial connecting arms 5, 6 after the inserts have been inserted which is indicated in the drawing by an enlargement of the cross section. The connecting arm 4 is also subject to a certain upsetting in radial direction. What follows is a relative displacement of the internal part 1 in the external part 2 upwardly in vertical direction; this can serve to compensate the deformation which develops after the static load is applied which is to be supported in its intended use. The relative mobility of the internal part 1 in the external part 2 is subsequently balanced in every direction, as indicated in FIG. 1a.

The inserts 8 are provided with projections 9 which close-fittingly contact the sides of the connecting arms in the areas of the separations on both sides. A relative displacement of the inserts can thus be eliminated as far as possible during the intended use of the rubber sleeve spring.

Figure 2:
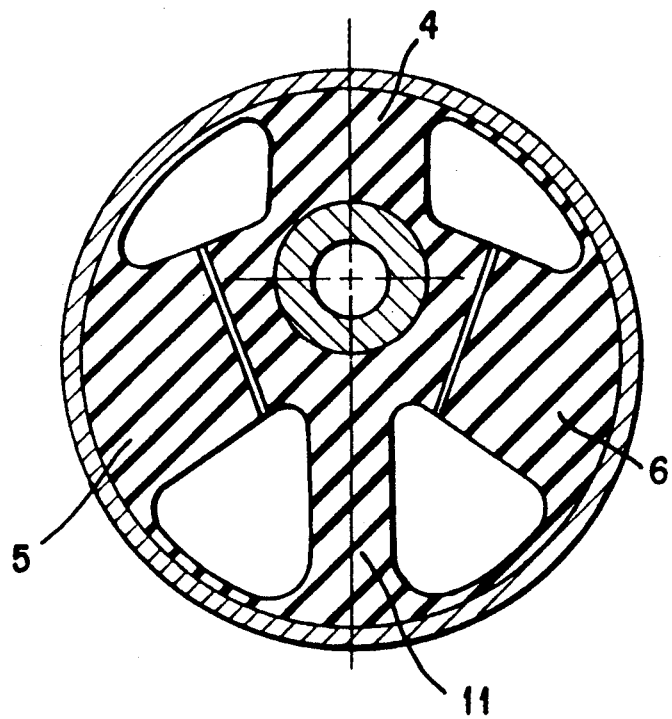
FIG. 2 is a cross-section of a second embodiment of sleeve spring prior to placement of the preload inserts.
Figure 2A:
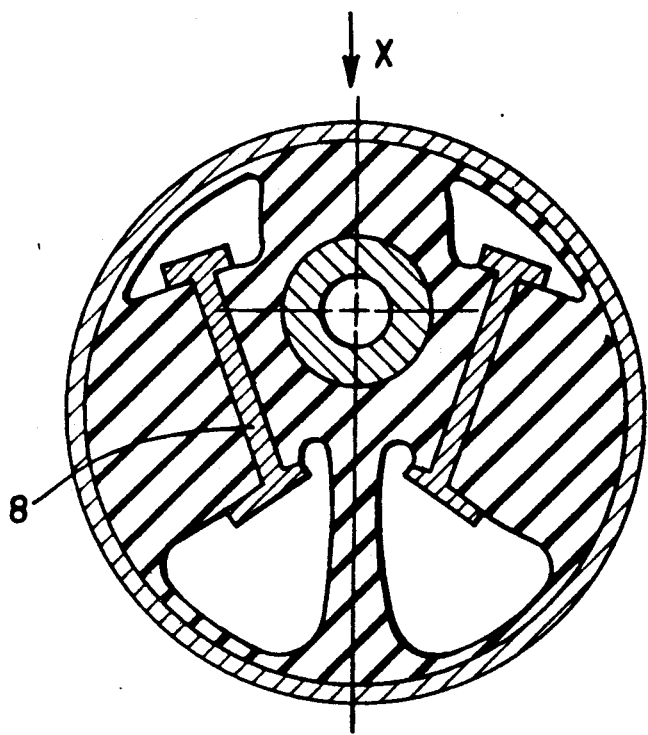
FIG. 2a is a cross-section corresponding to FIG. 2 after placement of the inserts.

FIGS. 2 and 2a show an embodiment of the rubber sleeve spring in which spring bodies provided with four connecting arms 4, 5, 6, 11 are used. The connecting arms 4, 5, 6 are configured similarly to the aforesaid description, the connection arm 11, however, has the shape of a relatively thick membrane. This results in a particularly good damping of the vibrations which occur during the intended use. The inserts 8 are made of hard plastic. They have a double-T-like profile which further increases the security against a relative displacement during the intended use of the ready-to-use rubber sleeve spring.

Figure 3:
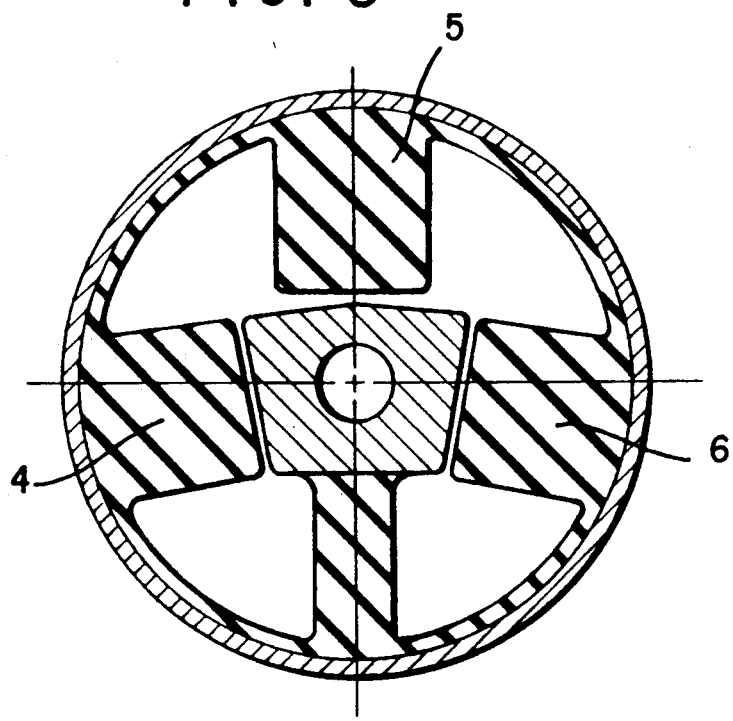
FIG. 3 is a cross-section of a third embodiment of sleeve spring prior to placement of the preload insert.
Figure 3A:
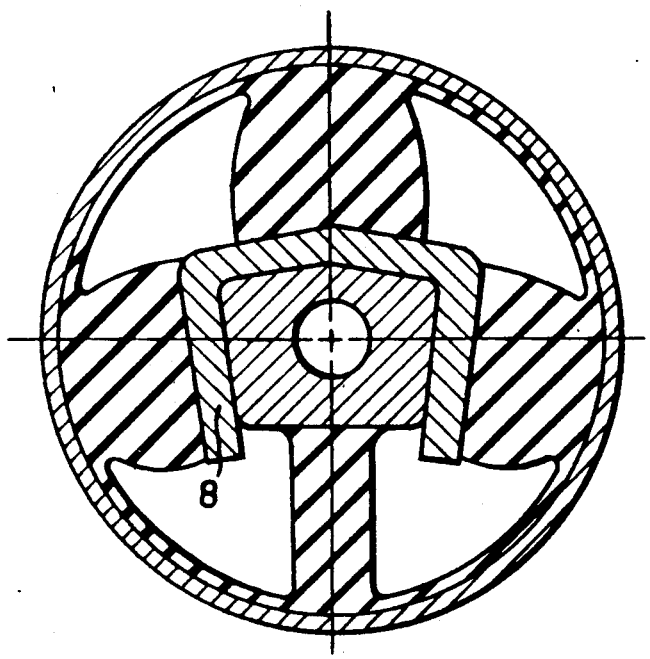
FIG. 3a is a cross-section corresponding to FIG. 3 after placement of the insert.

The embodiment as represented in FIGS. 3 and 3a is configured corresponding to the ones described above. In this embodiment, however, the separations 7 are provided in the three connecting arms 4, 5, 6 directly adjacent to the internal part 1. The latter is rigidly configured and made of a metallic material. The possibility is thereby given to provide all separations with inserts which are configured as one piece and having a U-profile which has a contracted cross section toward its ends. This results simultaneously in a positive attachment of the inserts in the finished rubber sleeve spring. The risk that a relative displacement occurs during use is thus excluded as far as possible and the insertion of the inserts is simplified.

Figure 4:
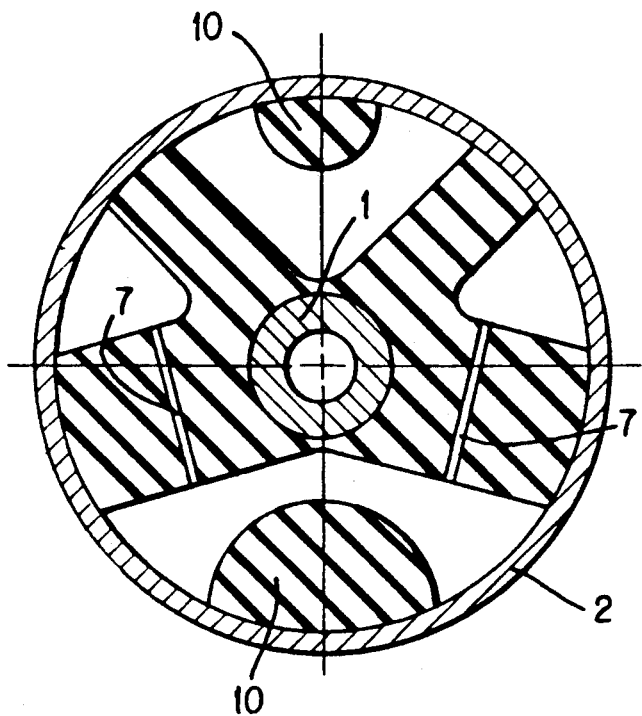
FIG. 4 is a cross-section of a third embodiment of sleeve spring prior to placement of the preload insert.
Figure 4A:
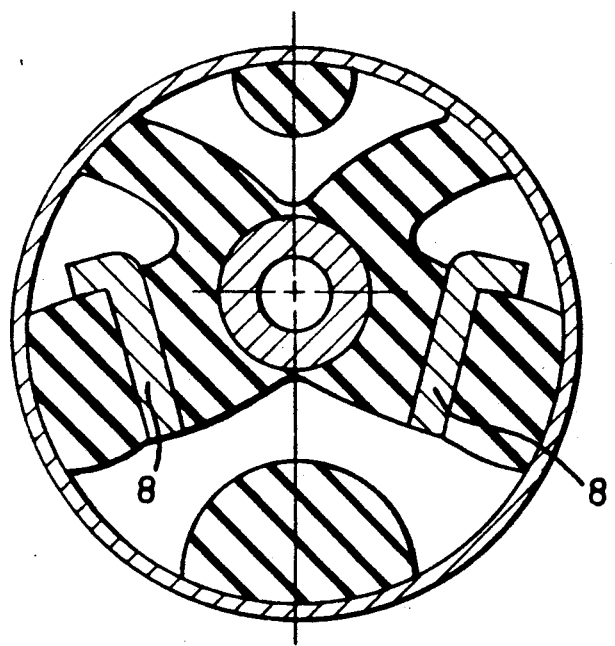
FIG. 4a is a cross-section corresponding to FIG. 4 after placement of the insert.

FIGS. 4 and 4a show a rubber sleeve spring in which the spring body has an X-shaped profile. The downwardly pointing and opposing connecting arms are provided with respective separations 7, which are mirror-inverted and associated with one another as well as with the connecting arms. The insertion of the inserts 8 results in the form change of the connecting arms as it is indicated in FIG. 4a. It is accompanied by relatively high compressive preloads in the latter and ensures a particular good guiding of the internal part 1 in the external part 2 during its intended use. Stop buffers 10 for the internal part 1 are provided vertically above as well as vertically below the internal part 1. They are configured beam-like and made of a rubber elastic material.

Figure 5:
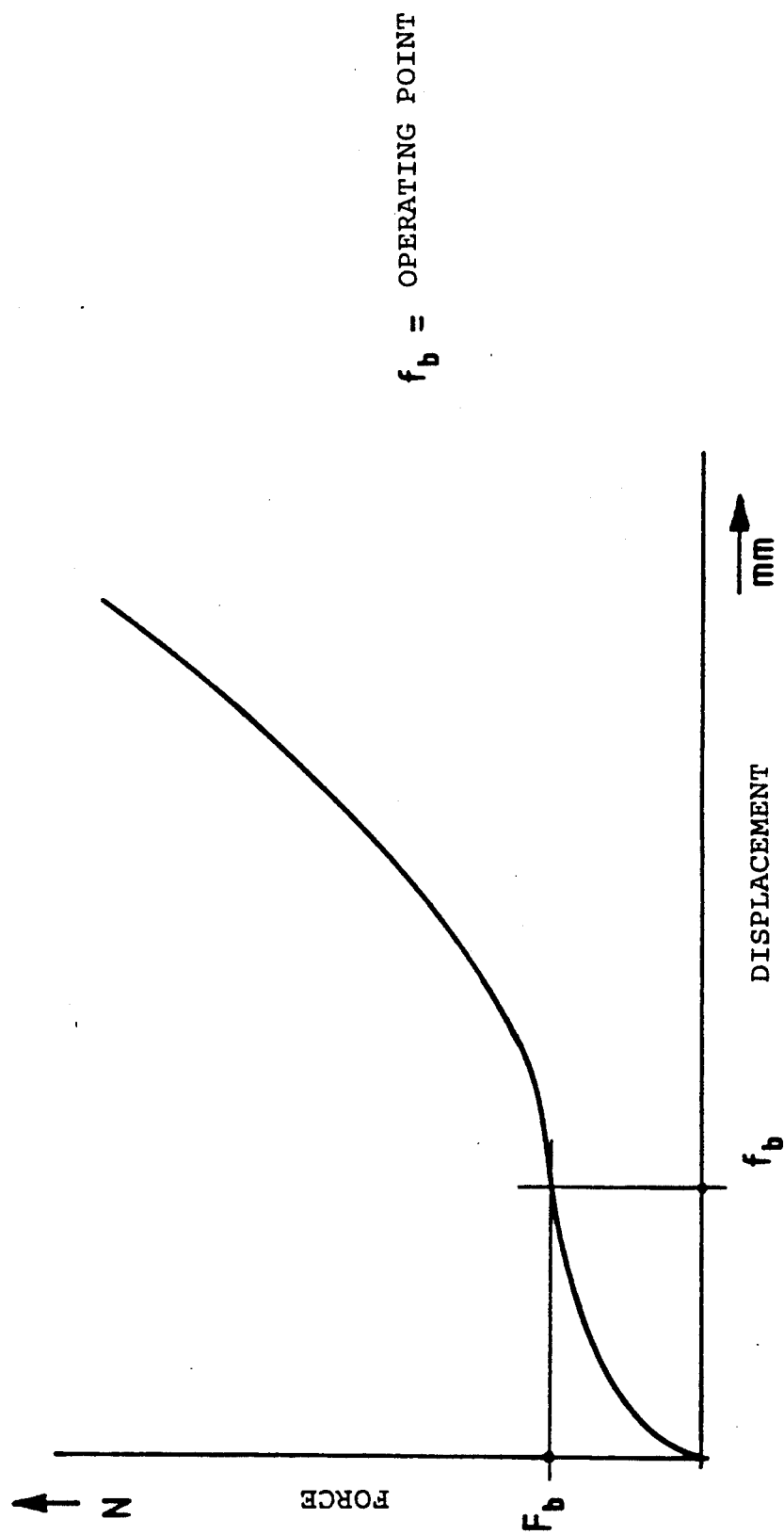
FIG. 5 is a force versuc displacement diagram for a sleeve spring in accordance with the invention.

As illustrated in FIG. 5 it is possible to support a particularly high static preload with the rubber sleeve spring in accordance with invention. However, in the operating point, there is still a significantly lower spring rigidity than in the known embodiments. This is a great advantage with regard to acoustically effective, high frequency vibrations.

I claim:

1. Rubber sleeve spring including an internal part, an external part enclosing the latter radially spaced therefrom and a gap therebetween in which is disposed a spring body of elastomeric material which is adhesively connected with the internal part and the external part, the spring body having at least three connecting arms between the internal part and the external part, characterized in that at least one of the connecting arms is divided by a separation along at least part of its length between the internal part and the external part, each separation extending parallel to the longitudinal direction of the internal and the external parts, an insert being provided in each respective separation while generating a compressive preload in the respective connecting arm.

2. Rubber sleeve spring as in claim 1, wherein the separation extends along the entire length of the connecting arm.

3. Rubber sleeve spring as in claim 1, wherein the insert has a shape which conforms to the separation.

4. Rubber sleeve spring as in claim 1, wherein separations are provided in two respective basically opposed connecting arms, the connecting arms and the separations are configured so as to be symmetric with respect to the internal and external parts.

5. Rubber sleeve spring as in claim 4, wherein the inserts which are inserted into the two separations have different thicknesses.

6. Rubber sleeve spring as in claim 1 wherein the separation is directly adjacent to the internal part.

7. Rubber sleeve spring as in claim 1 wherein the insert is provided with at least one projection protruding from the separation and that in a direction which extends transversely to the separation, the projection has a larger width than the insert and the connecting arm.

8. Rubber sleeve spring as in claim 7, wherein projection is provided on two sides of the separation at the insert.

9. Rubber sleeve spring as in claim 1 wherein the insert is rigidly configured.

10. Rubber sleeve spring comprising an internal part, an external part enclosing the internal part and radially spaced therefrom to form a gap therebetween, a vulcanized rubber spring body in said gap and bonded to the internal part and the external part, said body having at least three connecting arms between the internal part and the external part, at least one of the connecting arms being divided by a separation along at least part of its length between the internal part and the external part, each separation extending parallel to the longitudinal direction of the internal part and the external part, and an insert provided in each respective separation subsequent to vulcanizing, each insert being dimensioned to generate a compressive preload in the respective arm.

11. Rubber sleeve spring as in claim 10 wherein said internal part and said external part are substantially tubular.

* * * * *